INVENTORS
J. C. McConnell
S. Pinnolis
W. E. A. Schmidt,
BY R. P. Miller
ATTORNEY Jan. 27, 1970 J. C. McCONNELL ET AL 3,491,425

APPARATUS FOR ASSEMBLING COMPONENTS OF A SEALED CONTACT SWITCH

Filed March 3, 1967 10 Sheets-Sheet 2

Jan. 27, 1970 J. C. McCONNELL ET AL 3,491,425

APPARATUS FOR ASSEMBLING COMPONENTS OF A SEALED CONTACT SWITCH

Filed March 3, 1967 10 Sheets-Sheet 5

3,491,425

APPARATUS FOR ASSEMBLING COMPONENTS OF A SEALED CONTACT SWITCH

James C. McConnell, Samuel Pinnolis, and Wilhelm E. A. Schmidt, Winston-Salem, N.C., assignors to Western Electric Company, Incorporated, New York, N.Y., a corporation of New York Filed Mar. 3, 1967, Ser. No. 620,320
Int. Cl. H01r *43/00;* B23p *19/04*
U.S. Cl. 29—203 7 Claims

ABSTRACT OF THE DISCLOSURE

A first transfer apparatus inserts a pair of elongated article components between upper and lower clamping jaws on a workholder mounted on a turret. The workholder is then moved adjacent to a second transfer apparatus which inserts a hollow article component into the workholder and moves the clamping jaws to insert the elongated components into the hollow component to assemble the article.

CROSS-REFERENCES TO RELATED APPLICATIONS

In an application of this same date by G. A. Marlin, J. C. McConnell, and W. E. A. Schmidt entitled "Apparatus for Assembling Sealed Contact Switches," there appears a detailed disclosure of an assembly fixture used in the fabrication of sealed contact switches. In an aplication entitled "Apparatus for Removing an Article Clamped in a Workholder" by S. Pinnolis and W. E. A. Schmidt, also of this same date, a device for removing completed sealed contact switches from the assembly fixture is disclosed.

BACKGROUND OF THE INVENTION

Sealed contact switches are fabricated by a multiple-station assembly machine having a plurality of assembly fixtures. The fixtures receive the components of a sealed contact switch, a glass sleeve, and a pair of contacts having a paddle-shaped portion and a shank portion, from transfer devices positioned at the first two stations of the machine. The sealed contact switch is then assembled by indexing the fixture through various assembly stations at which assembly operations are performed.

In positioning the components of the sealed contact switch in an assembly fixture, it is desirable to locate the components in precisely the same relative positions in order to produce sealed contact switches having uniform characteristics. For this purpose, it is necessary to accurately align a pair of contacts on a transfer device before the transfer device is moved to positively position the contacts in a precise spaced relationship within the assembly fixture. Next, it is necessary to accurately insert a glass sleeve into the assembly fixture in a predetermined position between the contacts whereafter the contacts are moved into an overlapping relationship within the sleeve.

SUMMARY OF THE INVENTION

An object of the present invention is to provide an apparatus for transferring components to an article to an assembly machine in which the article components are accurately positioned on a movable transfer member before and during movement of the transfer member toward the assembly machine in order to insert the components in predetermined positions in a workholder on the machine.

Another object of the present invention is to provide a transfer apparatus for accurately inserting articles in predetermined positions into movable holding devices of a workholder and for moving the holding devices to predetermined positions on the workholder in order to locate the articles in a precise configuration.

With these and other objects in view, the present invention contemplates facilities for sequentially loading article components in a common assembly fixture which is subsequently operated to assemble the components. These facilities include a first transfer device located at a first station for transferring a pair of article components into movable holding devices mounted on an assembly fixture of the machine and a second transfer device located at a second station for transferring another article component into a resilient holding device mounted on the fixture. The assembly machine includes an indexible turret having a plurality of assembly fixtures which are advanced to the assembly stations of the machine. After an assembly fixture has received the article components from the first and second stations, the movable holding devices of the fixture are advanced toward the resilient holding device by movable actuator members mounted on the second transfer device to insert the first pair of articles into opposite ends of the second article in an overlapping relationship.

The loading of the first article components into the assembly fixture is accomplished by the first transfer device which includes a transfer member pivotally mounted to a block having a cutout portion for receiving the transfer member. The first pair of article components are directed through passageways formed in the block to a pair of extensions on the transfer member and are held against the transfer member by a vacuum applied through passageways in the extensions. A sliding plate mounted to the block which normally covers a part of the cutout portion and the extensions of the transfer member is moved along the block to uncover the transfer member extensions and the pair of article components held thereon. When the transfer member is pivoted out of the cutout portion of the block and as it is moved toward an assembly fixture, one of the components is swept over a camming member to accurately adjust the position of that component on the transfer member in order to locate the article components in predetermined positions in the assembly fixture.

The loading of a hollow component into the assembly fixture is accomplished by the second transfer device which includes a transfer member mounted for reciprocation toward and away from the assembly fixture. A guide member is pivotally mounted adjacent to the transfer member and is urged against its front face. An article component is inserted between the front face of the transfer member and the guide member and then the transfer member is moved toward the fixture. The guide member pivots out of the path of the transfer member and the component is held against the front face of the transfer member by a vacuum applied through passageway in the transfer member. The article component is moved past a camming member which accurately adjusts the position of the component on the transfer member so that it is inserted in the resilient holding device in a predetermined position.

BRIEF DESCRIPTION OF THE DRAWING

Other objects and advantages of the present invention will become apparent upon consideration of the following detailed description in conjunction with the accompanying drawing, wherein.

DETAILED DESCRIPTION

Description of the assembly machine

Figure 1:
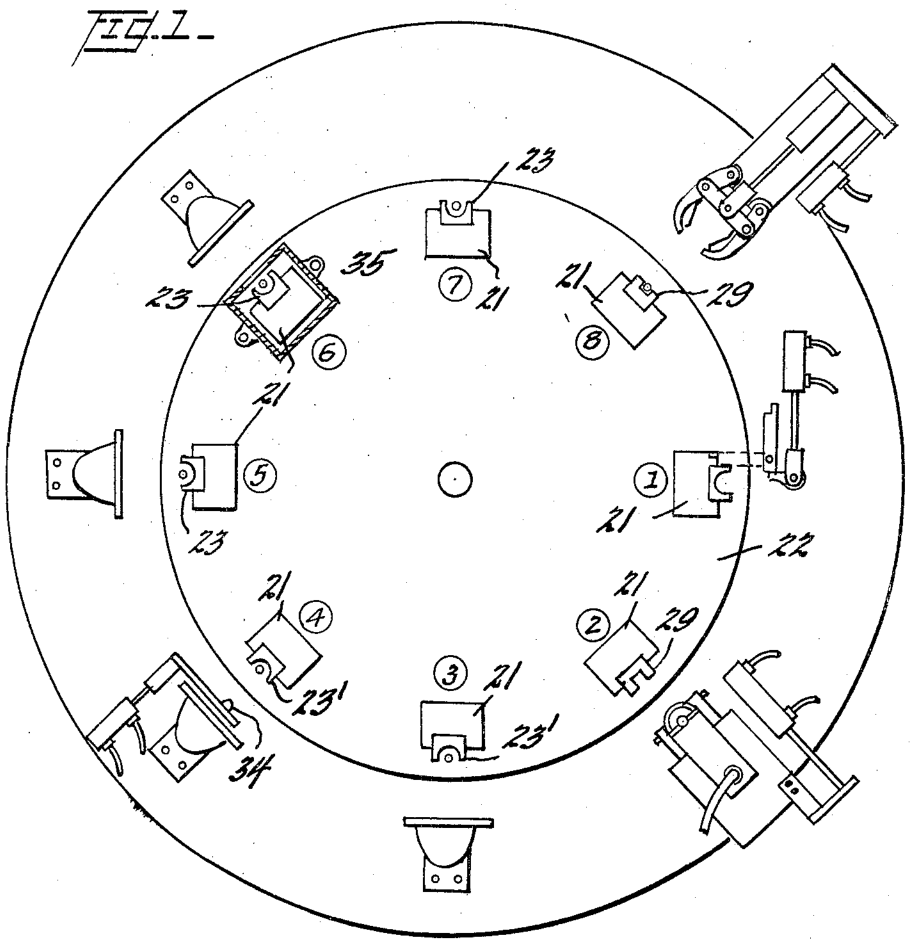
FIG. 1 is a plan view of an apparatus for assembling sealed contact switches having an indexible turret on which are mounted a plurality of assembly fixtures which are moved past a plurality of assembly stations.
Figure 6:
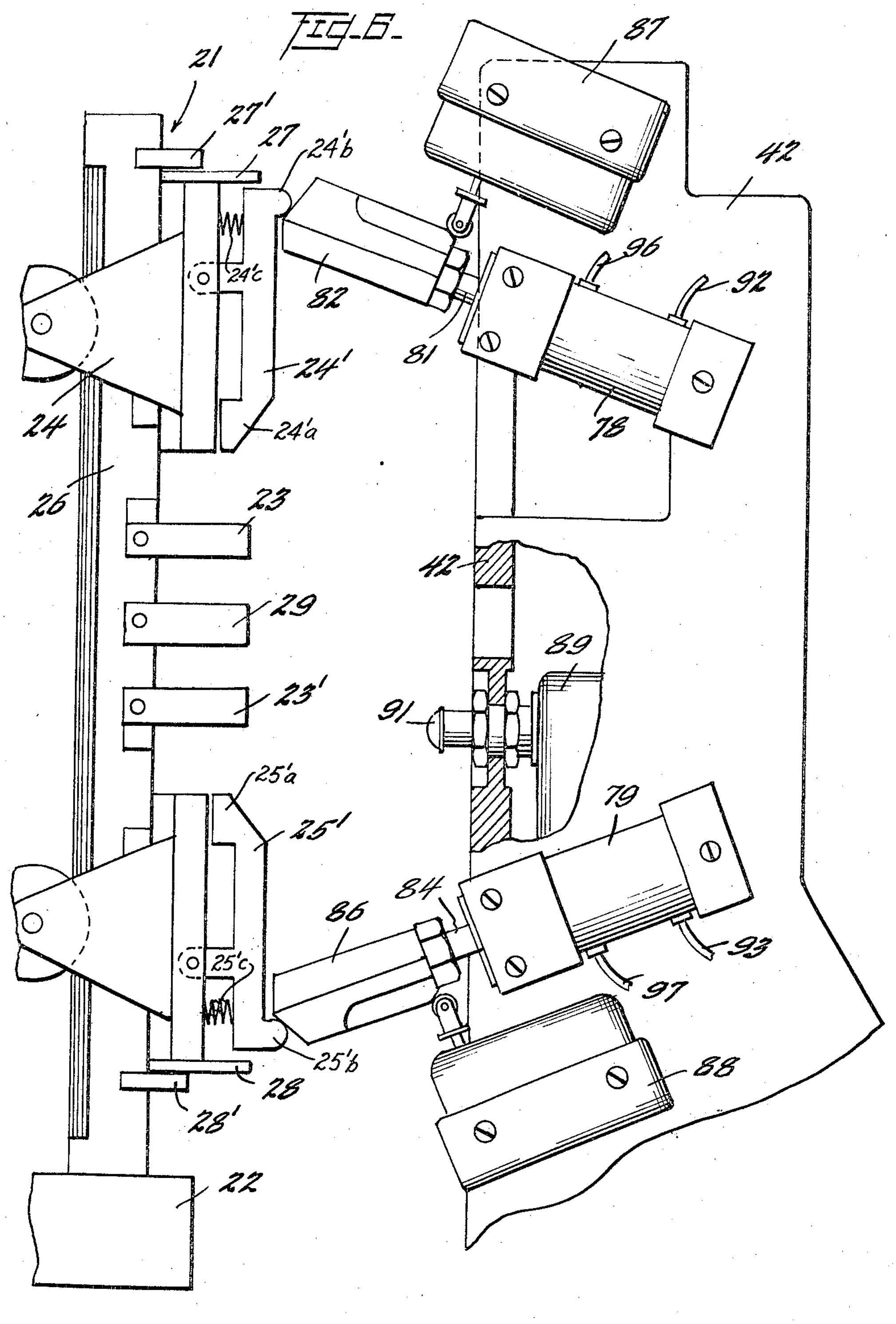
FIG. 6 is a front elevational view of the transfer device illustrating the actuator members for operating the jaw members of an assembly fixture positioned adjacent to the transfer apparatus and a plurality of safety switches.
Figure 10:
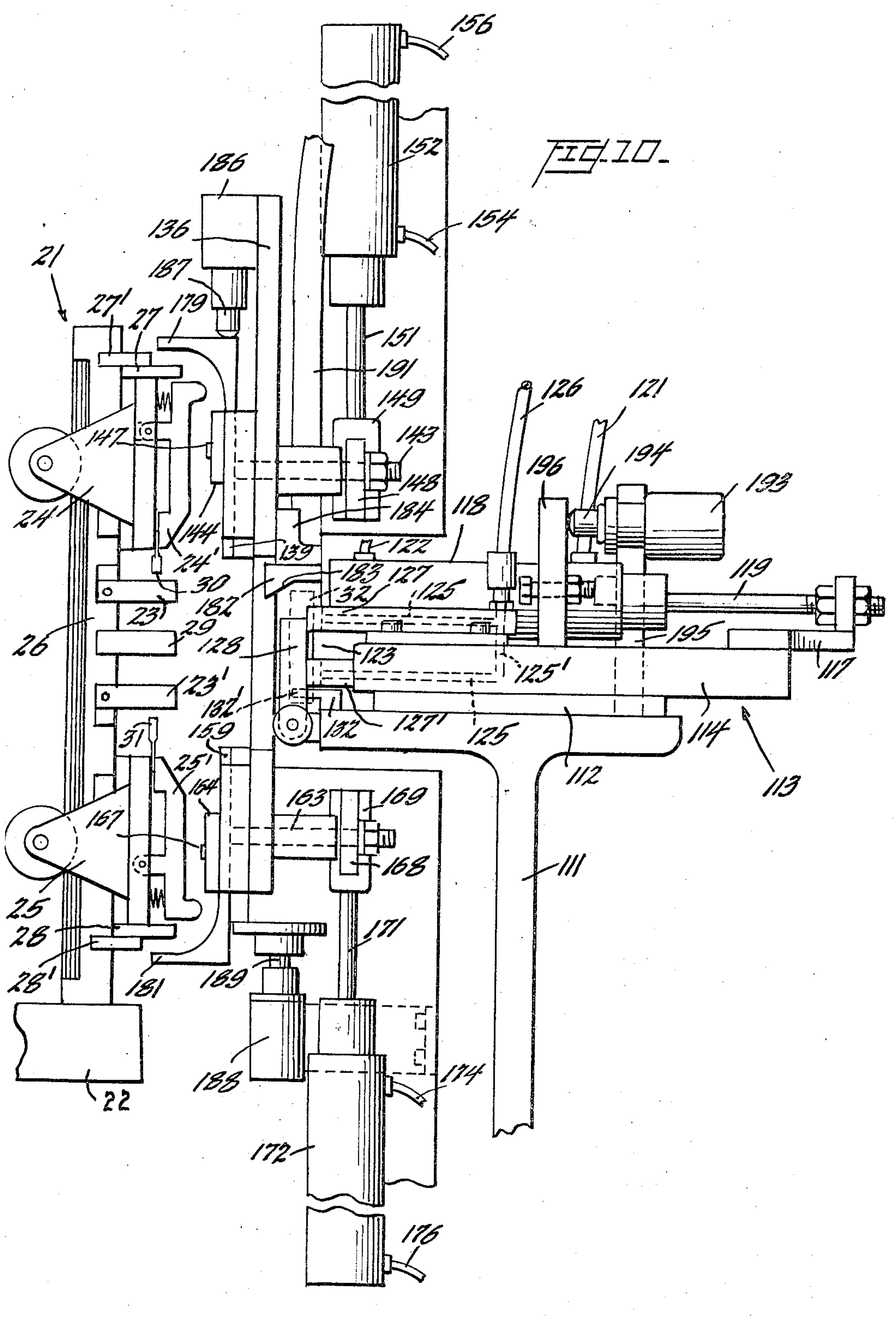
FIG. 10 is a side elevational view of a transfer device positioned at the second station of the assembly apparatus of FIG. 1 illustrating a slide for transferring a glass sleeve to a resilient holding device on an assembly fixture and a camming member for adjusting the position of the glass sleeve on the slide as it is moved toward the assembly fixture.

In FIG. 1 there is shown an apparatus for assembling sealed contact switches having a plurality of stations at which assembly operations are performed. The assembly machine includes a plurality of assembly fixtures 21 which are mounted upon an indexible turret 22. As shown in FIGS. 6 and 10, each assembly fixture 21 includes an upper carriage 24 having a pivotal jaw member 24′ and a lower carriage 25 having a pivotal jaw member 25′ slidably mounted upon a standard 26. The jaw members 24′ and 25′ each have an article receiving portion **24′*a* and 25′*a* at one end thereof and an enlarged butt portion 24′*b* and 25′*b* at the opposite end. The article receiving portions 24′*a* and 25′*a* are normally urged into a gripping relationship springs 24′*c* and 25′*c* adjacent the butt portions. A plate 27 projects from the upper carriage 24 and a plate 28 projects from the lower carriage 25. A glass sleeve holder 29 is mounted on the standard 26 between an upper reflector 23 and a lower reflector 23′**.

In the operation of the assembly machine, the turret 22 is indexed through a plurality of assembly stations 1–8. At station 1, the carriages 24 and 25 are moved to their extreme upper and lower positions, respectively, on the standard 26 and a transfer mechanism positioned at that station operates to feed an upper contact 30 (FIGS. 8 and 10) to the carriage 24 and a lower contact 31 to the carriage 25. At station 2 another transfer mechanism operates to feed a glass sleeve 32 (FIGS. 10 and 13) into the holder 29 and the carriages 24 and 25 are then moved along the standard 26 toward the holder 29 to insert the contacts 30 and 31 into the glass sleeve 32 in an overlapping relationship. Then the fixture 21 is advanced to station 3 where a radiant heater is activated to preheat the lower end of the glass sleeve 32 and the lower contact 31 by directing radiant energy toward the lower reflector 23′. At station 4 the upper contact 30 is magnetized to attract and support the lower contact 31 and an actuator member 34 opens the jaw member 25′ to release the lower contact 31. Then a radiant heater is activated to seal the lower contact 31 within the lower end of the glass sleeve 32. The fixture 21 is then advanced to station 5 at which the upper end of the glass sleeve 32 and the upper contact 30 are preheated by directing radiant energy to the upper reflector 23. After the holder 29 is moved laterally to set a desired gap between the contacts 30 and 31, the fixture 21 is indexed to station 6 where a hood 35 is lowered over the fixture 21 and the upper end of the contact 30 is sealed in the upper end of the glass sleeve 32. Thereafter, the fixture 21 is moved to station 7 where the completed sealed contact switch is allowed to cool. Finally, at station 8 the completed sealed contact switch is removed from the assembly fixture 21.

Apparatus for transferring contacts to an assembly fixture

Figure 2:
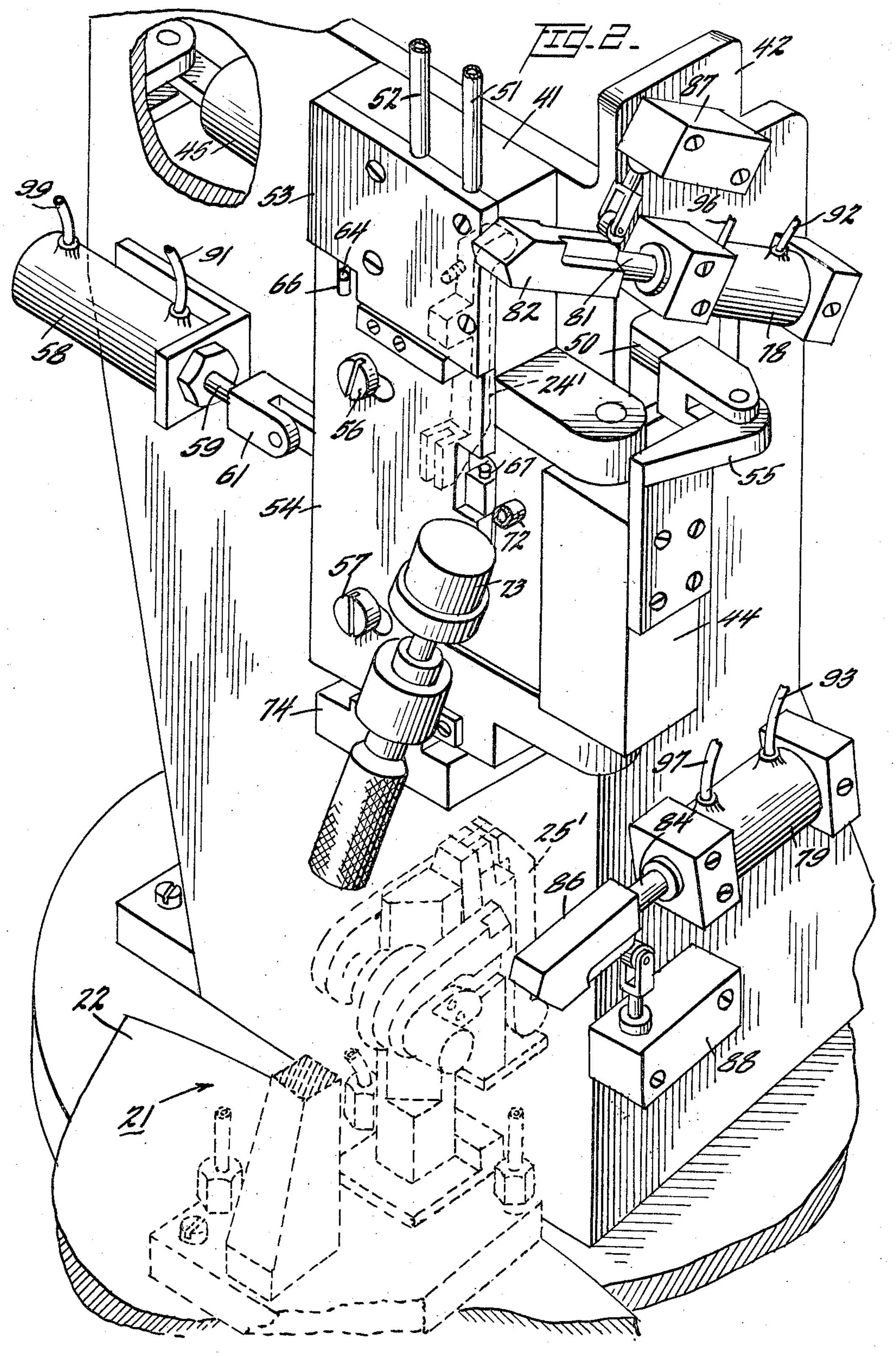
FIG. 2 is a perspective view of a transfer device positioned at the first station of the assembly apparatus of FIG. 1 including a pair of actuator members for operating jaw members on an assembly fixture and a sliding plate which normally covers a portion of a pivotal transfer member for inserting a pair of contacts into the assembly fixture.
Figure 3:
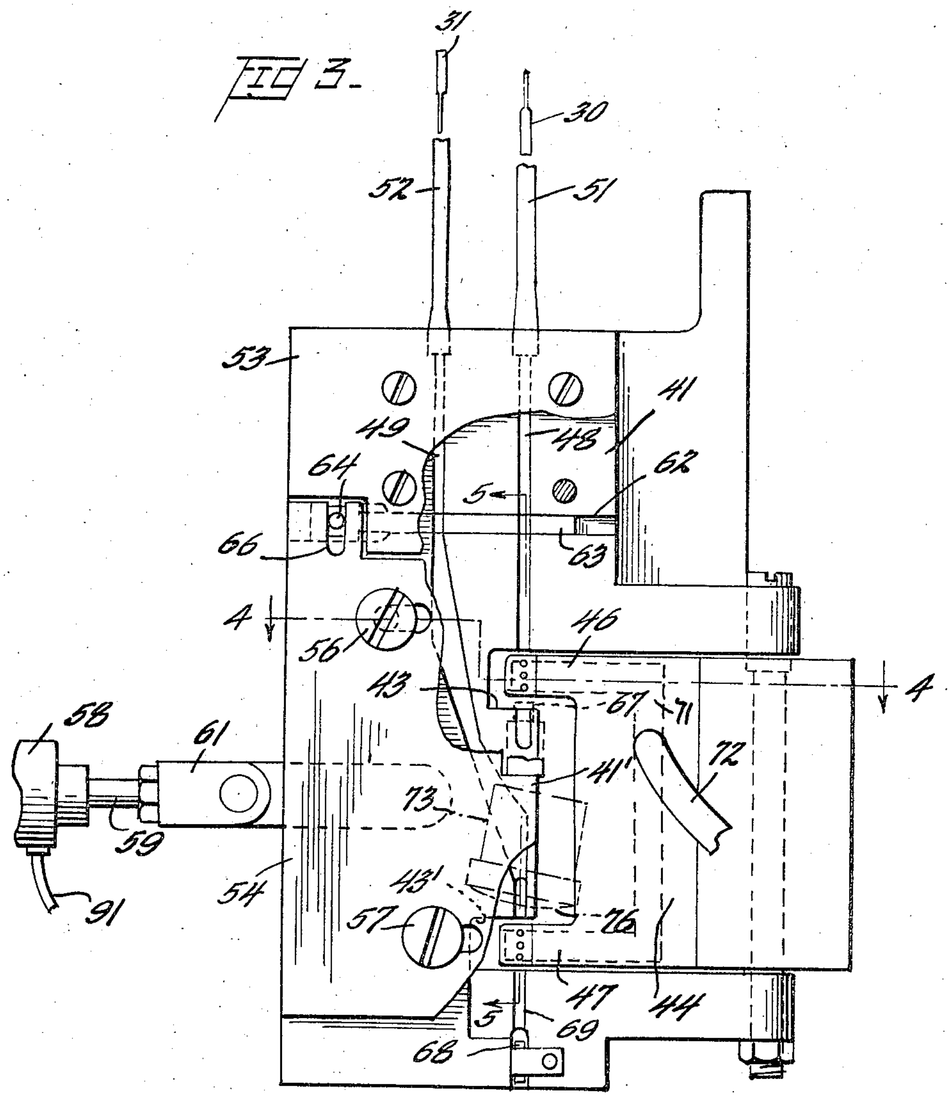
FIG. 3 is a side elevational view, partially cutaway, of the transfer device of FIG. 2, illustrating a block having cutout portions for receiving extensions of the pivotal transfer member and a pair of passageways terminating in the cutout portions for directing a pair of contacts to the extensions of the transfer member.

A transfer apparatus is positioned at station 1 of the assembly apparatus of FIG. 1 for transferring contacts to the assembly fixture 21 of the assembly machine. The transfer apparatus shown in FIGS. 2–5 includes a block 41 mounted to a frame 42. The block 41 has upper and lower cutout portions 43 and 43′ (FIG. 3) formed in one of its sides defining a block projection 41′ therebetween. A transfer member 44 is mounted to the block 41 for movement in a pivotal path into and away from the cutout portions 43 and 43′. An air cylinder 45 (FIGS. 2 and 7) having a piston rod 50 extending from one end is mounted to the frame 42. The piston rod 50 is connected by a bracket 55 to the transfer member 44. The transfer member 44 has an upper extension 46 and a lower extension 47 (FIGS. 3 and 8) which are received in the cutout portions 43 and 43′, respectively, and can be moved toward an assembly fixture 21 positioned adjacent to the transfer device. The block 41 has a first passageway 48 (FIG. 3) which extends from an upper surface of the block 41 and terminates in an upper surface of the cutout portion 43 above the extension 46 of the transfer member 44. The block 41 also has a second passageway 49 which extends from the upper surface of the block 41 through the block projection 41′ and terminates in an upper surface of the cutout portion 43′ above the extension 47 of the transfer member 44. As shown in FIGS. 2 and 3, a tube 51 is connected to the passageway 48 and a tube 52 is connected to the passageway 49.

Figures 4, 5, 7:
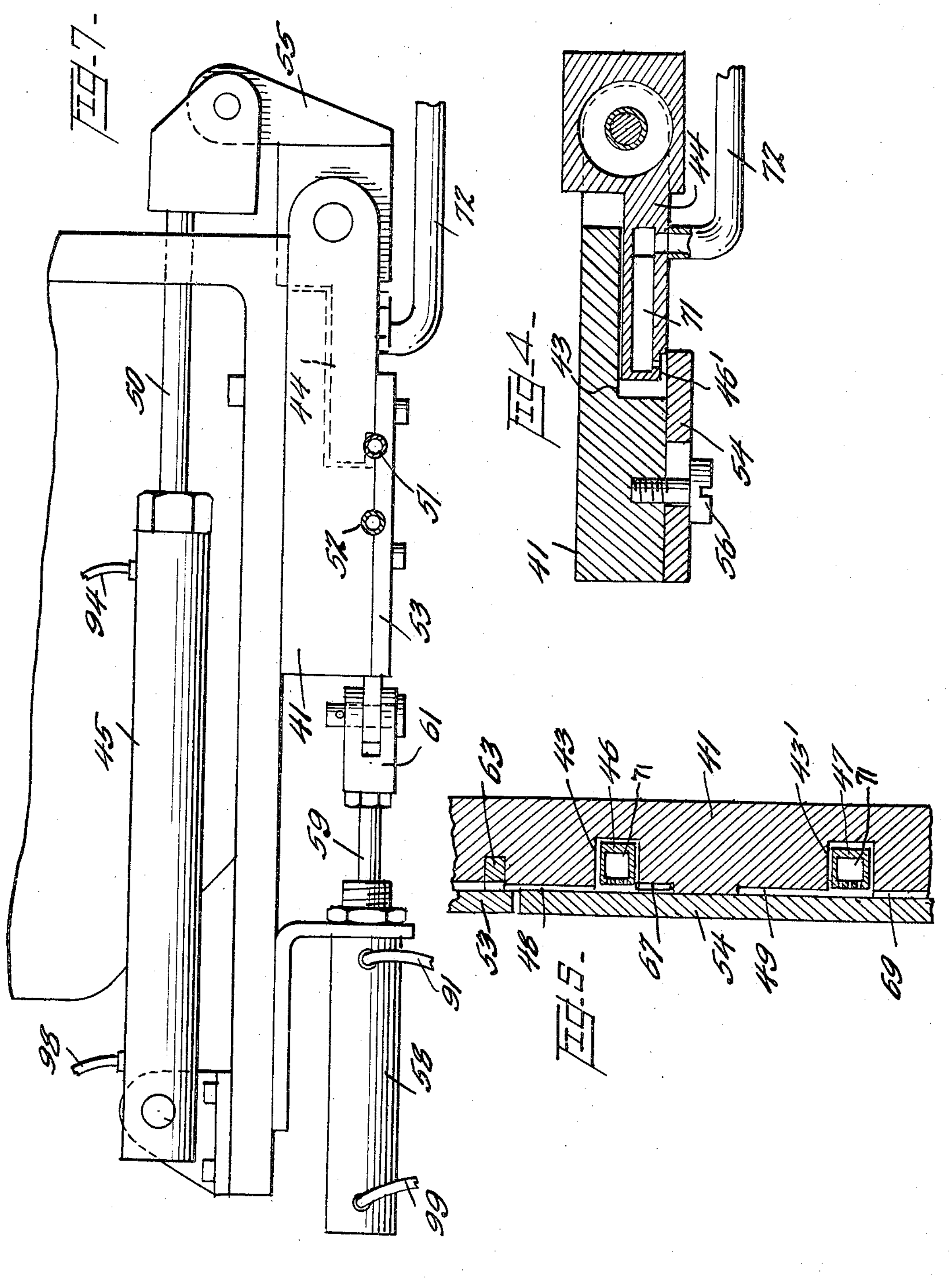
FIG. 4 is a sectional view taken along line 4—4 of FIG. 3 illustrating the transfer member received in a cutout portion of the block and covered by the sliding plate.
FIG. 5 is a sectional view taken along line 5—5 of FIG. 3 showing the extensions of the transfer member covered by the sliding plate.
FIG. 7 is a plan view of the transfer device illustrating an air cylinder for pivoting the transfer member.

A plate 53 is connected to the block 41 by a plurality of bolts such that an inner surface of the plate 53 covers a portion of the passageways 48 and 49 and forms side walls of the passageways 48 and 49. A plate 54 is slidably connected to the block 41 by a pair of bolts 56 and 57. As shown in FIGS. 4 and 5, an inner surface of the plate 54 normally covers the cutout portions 43 and 43′ and is spaced from the extensions 46 and 47 of the transfer member 44 in the pivotal path of the transfer member 44.

The plate 54 also covers portions of the passageways 48 and 49. An air cylinder 58 mounted to the frame 42 has a piston rod 59 extending from its front end which is connected to the plate 54 by a link 61.

The block 41 also has a groove 62 formed therein which cuts across the passageways 48 and 49. An escapement member 63 (FIGS. 3 and 5) is slidably received in the groove 62. The escapement member 63 has a pin 64 which projects outward from the block 41 and is received in a slot 66 formed in the plate 54. The escapement member 63 has a pair of openings therein which are normally in alignment with the passageways 48 and 49 when the plate 54 is positioned to cover the extensions 46 and 47 of the transfer member 44 as shown in FIG. 3. An adjustable stop 67 is mounted on the block projection 41' and projects into the cutout portion 43 beneath the termination of the passageway 48. An adjustable stop 68 is mounted in a slot 69 formed in the block 41 beneath the termination of the passageway 49.

Figure 8:
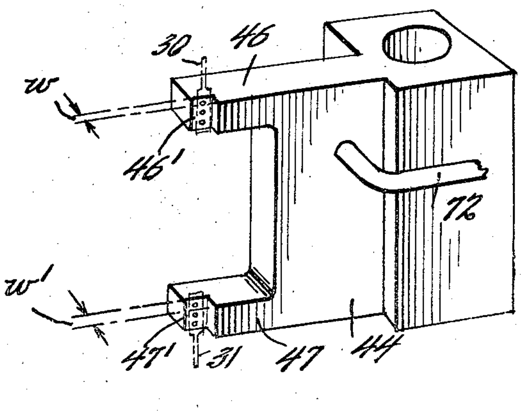
FIG. 8 illustrates a pair of extensions formed on the transfer member having a pair of flat recessed surfaces against which the contacts are held.

As shown in FIG. 8, the extension 46 of the transfer member 44 has a recessed surface 46' which is spaced from a front side of the transfer member 44 by a distance *w*. A plurality of holes are formed in the recessed surface 46' which open into a passageway 71 (FIGS. 3 and 5) formed within the transfer member 44 and which has an opening in its front side. Similarly, the extension 47 of the transfer member 44 has a recessed surface 47' formed therein and spaced from the front side of the transfer member 44 by a distance *w'* which is larger than the distance *w*. The recessed surface 47' also has a plurality of holes which open into the passageway 71. A flexible hose 72 is connected to the opening of the passageway 71 formed in the front side of the transfer member 44 and is used to apply a vacuum to the passageway 71.

FIG. 2 also illustrates an adjustable camming member 73 which is mounted adjacent to the transfer member 44 by a bracket 74. The camming member 73 has a lower tapered surface 76 (FIG. 3) which is located slightly above the pivotal path extension 47 of the transfer member 44.

As shown in FIGS. 2 and 6, a pair of air cylinders 78 and 79 are angularly positioned on the frame 42 such that the air cylinder 78 points in an upward direction and the air cylinder 79 points in a downward direction. The air cylinder 78 has a piston rod 81 projecting from its front end. An actuator member 82 is connected to the piston rod 81. The actuator member 82 is utilized to pivot the jaw member 24' of the upper carriage 24. Similarly the air cylinder 79 has a piston rod 84 extending from its front end and an actuator member 86 is connected to the piston rod 84. The actuator member 86 is used to operate the jaw member 25' on the carriage 25. A microswitch 87 mounted above the air cylinder 78 on the frame 42 is operated by movement of the actuator member 82. A microswitch 88 mounted below the air cylinder 79 on the frame 42 is operated by movement of the actuator member 86.

FIG. 6 also illustrates a switch 89 mounted to the frame 42 and having a plunger 91 which projects through the frame 42 and is operated by the transfer member 44.

Control circuit for the contact transfer apparatus

Figure 9:
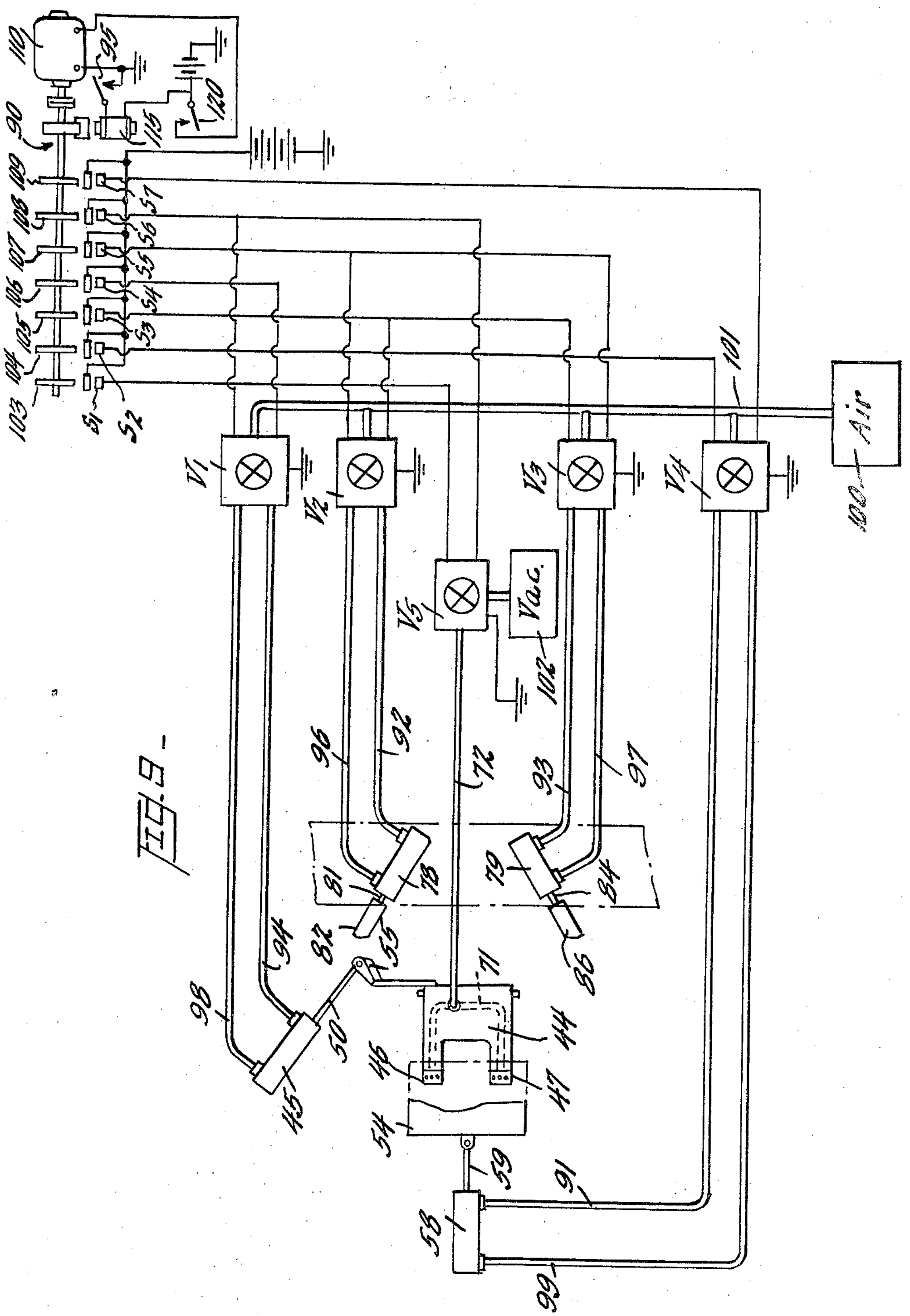
FIG. 9 is a schematic diagram of a circuit utilizing a plurality of valves to supply pressurized air to air cylinders which operate the actuator members, the sliding plate, and the pivotal transfer member of the transfer apparatus of FIG. 2.

A circuit having a plurality of valves $V_1$–$V_5$ (FIG. 9) is utilized to operate the contact transfer apparatus of the present invention. As shown in FIG. 9, a plurality of four-way valves $V_1$–$V_4$ are connected to a source 100 of pressurized air through a common line 101. The output lines of valve $V_1$ are connected to flexible hoses 94 and 98 extending from the air cylinder 45 which operates the transfer member 44. The output lines of valve $V_2$ are connected to flexible hoses 92 and 96 extending from the air cylinder 78 which operates the actuator member 82. A pair of flexible hoses 93 and 97, attached to the air cylinder 79 which operates the actuator member 86, are connected to the output lines of valve $V_3$. The output lines of valve $V_4$ are connected to flexible hoses 91 and 99 of the air cylinder 88 for operating the sliding plate 54. Finally, the flexible hose 72 extending from the transfer member 44 is connected through the valve $V_5$ to a vacuum source 102.

The operation of valves $V_1$–$V_5$ is controlled by a plurality of cams 103–109 mounted upon a shaft which is rotated by a timing motor 110. The motor 110 is connected to a single cycle timing circuit which includes a switch 95 and a solenoid 115 which operates a switch 120. The switch 95 is operated by the indexing mechanism of the turret 22 so that the motor 110 is energized during a dwell portion of the turret cycle. The solenoid 115 also operates an escapement mechanism 90 which limits the rotation of the motor shaft to one revolution. A slip clutch is mounted on the motor shaft to compensate for overrun of the timing motor. The cams 103–109 operate a plurality of switches $S_1$–$S_7$ through which an operating potential is applied to the valves $V_1$–$V_5$ by a potential source. The angular positions of the cams 103–109 relative to the motor shaft are adjustable so that any desired sequence of operation of the switches $S_1$–$S_7$ can be obtained by setting the cams 103–109 at desired angular positions.

Operation of the contact transfer apparatus

In the operation of the transfer apparatus of FIG. 2, after the turret 22 has been indexed to advance an assembly fixture 21 to a position adjacent to the transfer apparatus, a contact 30 (FIG. 3) having a shank portion and a flat, paddle-shaped portion is inserted in the tube 51 with its paddle-shaped end down. The contact 30 is directed by the passageway 48 to a position adjacent to the extension 46 of the transfer member 44 where it rests upon the stop 67.

At the same time, a contact 31 is inserted in the tube 52 with its paddle-shaped portion up. The contact 31 is directed through the passageway 49 to a position adjacent to the extension 47 of the transfer member 44 where it rests upon the stop 68. The movement of the turret 22 closes the switch 95 (FIG. 9) momentarily to energize the solenoid 115. The solenoid 115 closes the switch 120 and releases the escapement mechanism 90 so that the motor 110 rotates its shaft and the cams 103–109 mounted thereon. The cam 103 is angularly positioned on the shaft so that it is first to operate its associated switch $S_1$. Upon the closing of switch $S_1$, the valve $V_5$ is operated to apply a vacuum from the source 102 to the flexible hose 72. When the vacuum is applied to the passageway 71 through the flexible hose 72, the flat portions of the contacts 30 and 31 are drawn against the recessed surfaces 46' and 47' (FIG. 8) and are held against those surfaces as long as the vacuum is applied to the hose 72.

As the shaft continues to rotate, the cam 104 is next to operate its associated switch $S_2$ to energize the valve $V_4$ such that pressurized air is applied to the air cylinder 58 through the air hose 91. The piston rod 59 is drawn into the air cylinder 58 to move the plate 54 away from the cutout portions 43 and 43' of the block 41 and out of the pivotal path of the extensions 46 and 47 of the transfer member 44. When the piston rod 59 is completely drawn into the air cylinder 58, the plate 54 is moved a sufficient distance to uncover the extensions 46 and 47 which hold the contacts 30 and 31. Movement of the plate 54 also moves the escapement member 63 such that the passageways 48 and 49 are temporarily closed to prevent any other contacts from moving toward the transfer member 44. The cam 105 then closes the switch $S_3$ whereby the valves $V_2$ and $V_3$ are operated to apply pressurized air to the air cylinders 78 and 79 through the flexible hoses 92 and 93. The piston rods 81 and 84 are driven outward from the air cylinders 78 and 79 to move the actuator members 82 and 86 into contact with the jaw members 24' and 25' to pivot the jaw members 24' and 25' into open positions and to move the carriages 24 and 25 against a pair of stops 27' and 28' on the standard 26 to their extreme upper and lower positions, respectively.

As the shaft continues to rotate, the cam 106 is next to operate its associated switch $S_4$ to energize the valve $V_1$ such that pressurized air is applied to the air cylinder 45 through the flexible hose 94 to draw the piston rod 50 into the air cylinder 45. The transfer member 44 is pivoted away from the cutout portions 43 and 43' of the block 41 toward the assembly fixture 21. As the transfer member 44 moves toward the assembly fixture 21, the contacts 30 and 31 are held against the recessed surfaces 46' and 47' of the transfer member 44 by the applied vacuum. When the lower extension 47 moves past the camming member 73, the paddle-shaped end of the contact 31 is brushed against the camming surface 76 of the camming member 73 to move the contact 31 downward on the recessed surface 47' to set the contact 31 to a desired position on the extension 47. Then the transfer member 44 is moved to its fully pivoted position where the contacts 30 and 31 are moved behind the jaw members 24' and 25'.

At this point the cam 107 operates the switch $S_5$ to switch the valves $V_2$ and $V_3$ so that pressurized air is applied to the air cylinders 78 and 79 through the flexible hoses 96 and 97 such that the piston rods 81 and 84 are drawn into the air cylinders 78 and 79. This movement of the piston rods 81 and 84 moves the actuator members 82 and 86 out of contact with the jaw members 24' and 25' thereby allowing the jaw members 24' and 25' to clamp the contacts 30 and 31.

After the contacts 30 and 31 are clamped, the cam 108 closes the switch $S_6$ to operate the valves $V_1$ and $V_5$. Thus, the air cylinder 45 is operated by applying pressurized air through the flexible hose 98 such that the piston rod 50 is driven outward from the cylinder 45 to move the transfer member 44 away from the assembly fixture 21 and into the cutout portions 43 and 43' of the block 41. At the same time, the valve $V_5$ is closed so that the vacuum is no longer applied to the flexible hose 72 and the contacts 30 and 31 are released from the transfer member 44. Finally, the cam 109 closes the switch $S_7$ to operate the valve $V_4$. The air cylinder 58 is thus operated by applying pressurized air through the flexible hose 99 such that the piston rod 59 is moved outward from the air cylinder 58. This movement of the piston rod 59 moves the plate 54 to its initial position on the block 41 where it covers the extensions 46 and 47 of the transfer member 44. This movement of the transfer member 54 also moves the escapement member 63 to its initial position within the groove 62 to open the passageways 47 and 49. At this point, the escapement mechanism 90 (FIG. 9) operates to prevent further rotation of the motor shaft. The solenoid 115 and the motor 110 are deenergized and the loading operation is completed. The transfer apparatus is now prepared to receive a new set of contacts 30 and 31 and to load the contacts 30 and 31 into another assembly fixture 21 which is moved to a position adjacent to the transfer apparatus.

It should be noted that the contact transfer device is provided with a plurality of safety switches as shown in FIG. 6. The switch 87 is operated by movement of the actuator member 82 such that the switch is closed when the actuator member 82 is in contact with the jaw member 24'. The switch 87 controls a circuit (not shown) which inhibits the turret indexing mechanism from operating when the actuator member 82 is in its extended position. Similarly, a switch 88 is operated by movement of the actuator member 86 such that when the actuator member 86 is in contact with the jaw member 25' the turret indexing mechanism cannot be operated. Finally, the switch 89 is operated through a plunger 91 by movement of the transfer member 44. The switch 89 also controls an inhibit circuit for the turret indexing mechanism such that the turret 22 cannot be indexed until the transfer member 44 is moved into the cutout portions 43 and 43' of the block 41 to move the plunger 91 into the switch 89. Thus, movement of the turret 22 cannot occur before the actuator members 82 and 86 and the transfer member 44 are moved to their initial positions in the transfer device.

Apparatus for transferring a glass sleeve to an assembly fixture

Figure 14:
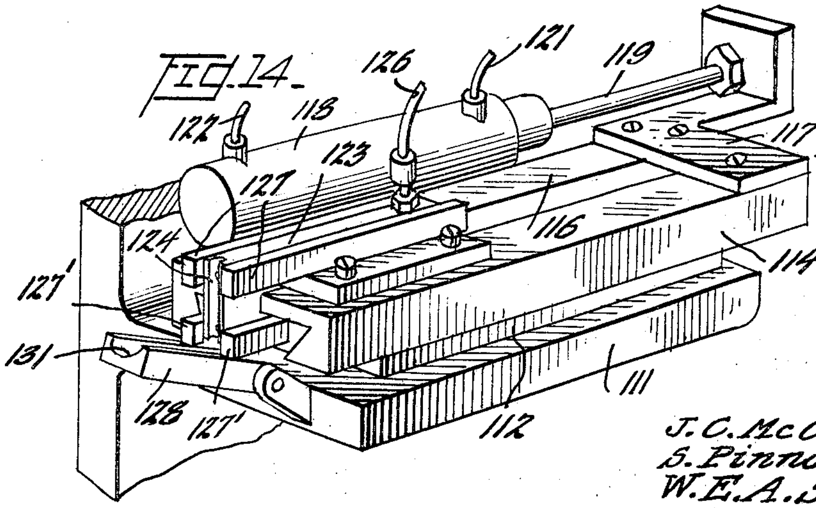
FIG. 14 is a perspective view of the transfer member as it advances toward the assembly fixture.

A transfer device is shown in FIG. 10 which is positioned at station 2 of the assembly machine shown in FIG. 1. Referring to FIGS. 10 and 14, the transfer device includes a frame 111 upon which is mounted a stationary guide member 112. A slide 113 is mounted in a dovetail fashion (FIG. 15) to the guide member 112 for movement toward and away from an assembly fixture 21 positioned in front of the transfer device. The slide 113 includes a pair of elongated members 114 and 116 connected together by a bracket 117 (FIG. 14). An air cylinder 118, mounted to the frame 111, has a piston rod 119 extending from one end which is connected to the bracket 117. The air cylinder 118 also has a pair of flexible hoses 121 and 122 connected at its opposite ends for applying pressurized air to the air cylinder 118. A transfer member 123 is mounted to the front end of the slide 113 and has a front face which projects past the front ends of the elongated members 114 and 116. The transfer member 123 has a groove 124 (FIG. 12) formed in its front face for receiving a glass sleeve. The transfer member 123 also has a pair of passageways 125 shown in FIGS. 10 and 13 which extend from the groove 124 to a common passageway 125' which terminates at a top surface of the transfer member 123 and is connected to a flexible hose 126. The flexible hose 126 is connected to a vacuum source 202 (FIG. 16) which is used to apply a suction force to a glass sleeve positioned in the groove 124 in the front face of the transfer member 123.

The transfer member 123 has an upper pair of arms 127 (FIG. 14) projecting from opposite sides of the transfer member 123 and extending past its front face. It also has a lower pair of arms 127' projecting from its opposite sides and spaced from the arms 127. The arms 127' also extend past the front face of the transfer member 123.

Figures 11, 15:
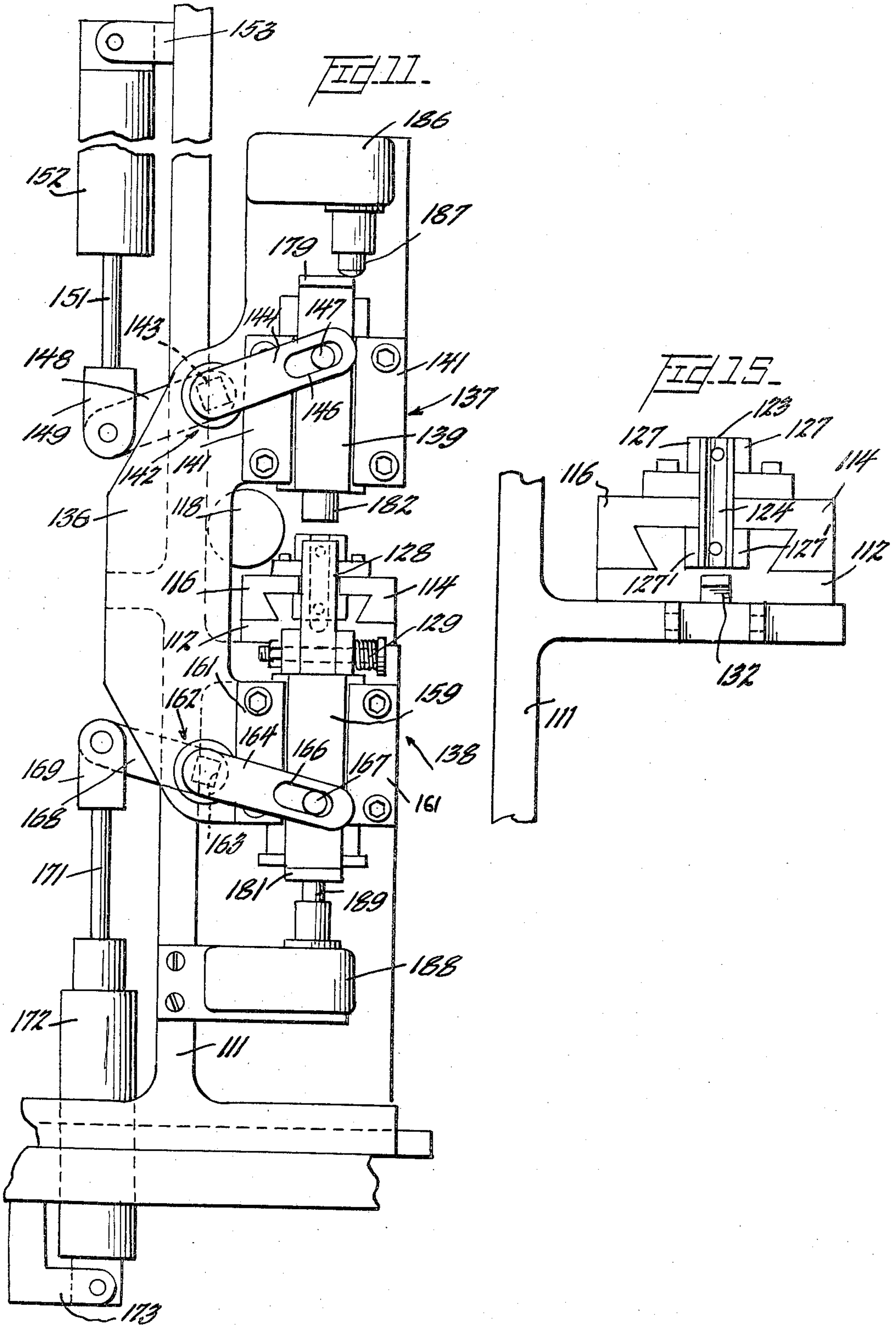
FIG. 11 is a front elevational view of the transfer apparatus of FIG. 10 illustrating a pair of movable actuator members mounted to the transfer device and a pair of switches operated by the actuator members.
FIG. 15 is a front view of the transfer member with the pivotal guide member removed.
Figure 12:
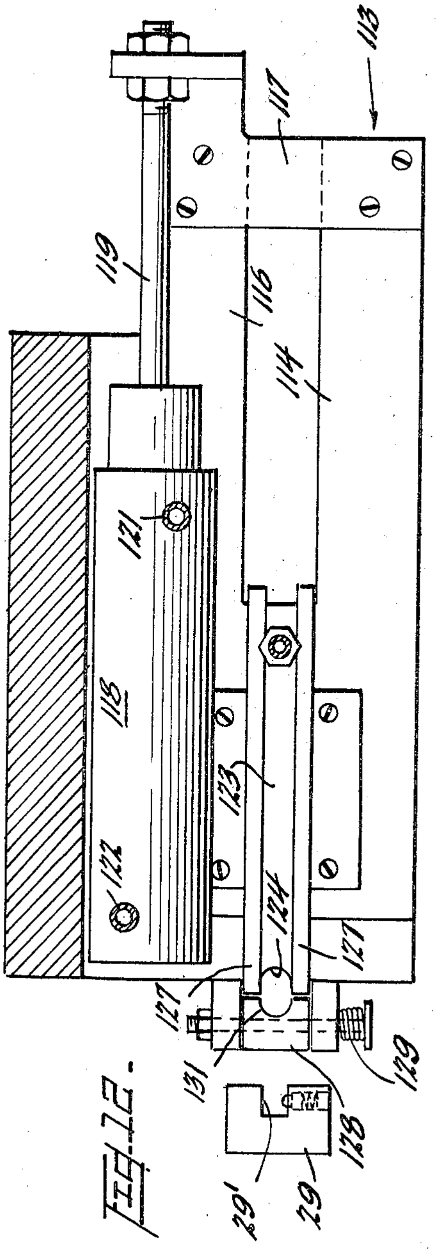
FIG. 12 is a plan view of the transfer apparatus of FIG. 10.

A guide member 128 is pivotally mounted to the frame 111 adjacent to the front end of the transfer member 123. The guide member 128 is urged against the front face of the transfer member 123 by a torsion spring 129 (FIG. 11). The guide member 128 has a groove 131 (FIGS. 12 and 14) formed in a side of the guide member 128 which is normally adjacent to the front face of the transfer member 123. The groove 131 cooperates with the groove 124 to receive a glass sleeve 32. A stop member 132 (FIG. 10) is mounted to the frame 111 beneath the transfer member 123 and has a projection 132' which extends past the bottom end of the groove 124 and into the groove 131 in the guide member 128. A glass sleeve which is positioned between the grooves 124 and 131 rests upon the projection 132'.

As shown in FIGS. 10 and 11, a plate 136 is mounted to the front end of the frame 111. The plate 136 has a cutout portion formed therein to provide an upper extended portion 137 and a lower extended portion 138. The transfer member 123 moves past the plate 136 through its cutout portion toward an assembly fixture 21 positioned in front of the transfer device. An actuator member 139 is slidably mounted to the upper extended portion 137 between a pair of guide members 141. A crank member 142 is pivotally mounted to the plate 136 adjacent to the actuator member 139. The crank member 142 has a central shaft portion 143 which extends through an opening in the plate 136. A first arm 144 extends from the central shaft portion 143 on the same side of the plate 136 as the actuator member 139. The arm 144 has a slot 146 formed therein which receives a pin 147 projecting from the actuator member 139. A second arm 148 extends from the opposite end of the shank portion 143 on the other side of the plate 136 and is connected by a link 149 to a piston rod 151 extending from an air cylinder 152. The air cylinder 152 is mounted to the frame 111 by a bracket 153 and has a pair of flexible hoses 154 and 156 (FIG. 10) extending from its opposite ends. Pressurized air is applied to the air cylinder 152 through the hoses 154 and 156 to operate the upper actuator member 139.

A lower actuator member 159 is slidably mounted between a pair of guide members 161 to the lower extended portion 138 of the plate 136. A crank member 162 is pivotally mounted to the plate 136 adjacent to the actuator member 159. The crank member 162 has a central shaft portion 163 which extends through an opening in the plate 136. A first arm 164 extends from the central shaft portion 163 on the same side of the plate 136 as the actuator member 159. The arm 164 has a slot 166 formed therein which receives a pin 167 projecting from the actuator member 159. A second arm 168 extends from the opposite end of the shaft portion 163 on the opposite side of the plate 136. The arm 168 connected by a link 169 to a piston rod 171 extending from an air cylinder 172. The air cylinder 172 is mounted to the frame 111 by a bracket 173 and has a pair of flexible hoses 174 and 176 extending from its ends. Pressurized air is applied to the air cylinder 172 through the flexible hoses 174 and 176.

As shown in FIGS. 10 and 11, the actuator member 139 has an upper projecting portion 179 extending from its front face toward the assembly fixture 21. Similarly, the actuator member 159 has a lower projecting portion 181 which extends from its front face toward the assembly fixture 21.

A camming member 182 (see FIG. 10) having an inclined surface 183 is mounted to the plate 136 by a bracket 184 such that the camming member 182 is positioned in front of and above the transfer member 123. The camming member 182 is used to adjust the position of the glass sleeve on the front face of the transfer member 123 as the transfer member 123 moves past the camming surface 183.

As shown in FIGS. 10 and 11, a first microswitch 186 is mounted to the plate 136 above the actuator member 139. The switch 186 has a plunger 187 which is operated by the actuator member 139 when the actuator member 139 is in its uppermost position on the plate 136. Similarly, a second microswitch 188 is mounted to the frame 111 beneath the lower actuator member 159. The switch 188 has a plunger 189 which is operated by the lower actuator member 159 when the member 159 is in its lowermost position on the plate 136.

Referring to FIG. 10, there is also shown a tube 191 which is mounted to the bracket 184 and terminates above the top surface of the transfer member 123. Glass sleeves are fed one at a time through the tube 191 to the grooved portions of the transfer member 123 and the guide member 128.

Finally, as shown in FIG. 10, a microswitch 193 having a plunger 194 extending from its front end is mounted by a bracket 195 to the frame 111. The plunger 194 is operated by a member 196 which projects from the elongated member 114 of the slide 113.

Control circuit for the glass sleeve transfer apparatus

Figure 16:
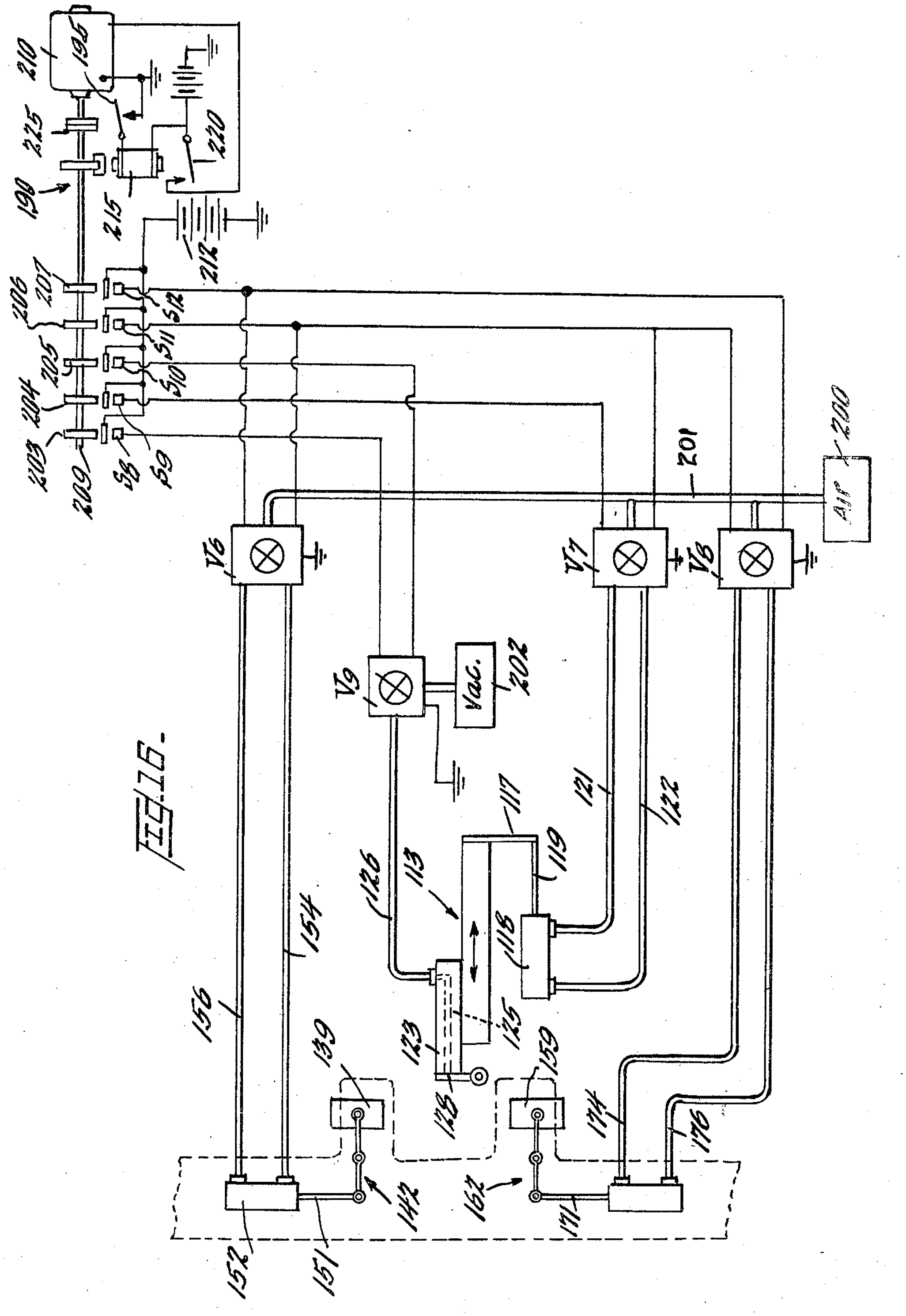
FIG. 16 is a schematic diagram of a circuit utilizing a plurality of valves to supply pressurized air to air cylinders for operating the actuator members and the transfer member of the transfer apparatus of FIG. 10.

A circuit having a plurality of valves $V_6$–$V_9$ (FIG. 16) is utilized to operate the glass sleeve transfer apparatus of the present invention. As shown in FIG. 16, a plurality of four-way valves $V_6$–$V_8$ are connected to a source 200 of pressurized air through a common line 201. The output lines of valve $V_6$ are connected to the flexible hoses 154 and 156 of the air cylinder 152 which operates the upper actuator member 139. The output lines of valve $V_7$ are connected to the flexible hoses 121 and 122 extending from the air cylinder 118 which operates the slide 113. The flexible hoses 174 and 176, attached to the air cylinder 172 which operates the lower actuator member 159, are connected to the output lines of valve $V_8$. Finally, the flexible hose 126 extending from the transfer member 123 is connected through the valve $V_9$ to a vacuum source 202.

The operation of the valves $V_6$–$V_9$ is controlled by a plurality of cams 203–207 mounted on a shaft 209 which is rotated by a timing motor 210. The motor 210 is connected to a single cycle timing circuit which includes a switch 195 and a solenoid 215 which operates a switch 220. The switch 195 is operated by the indexing mechanism of the turret 22 so that the motor 210 is energized during a dwell portion of the turret cycle. The solenoid 215 also operates an escapement mechanism 190 mounted on the shaft 209 to limit the rotation of the shaft 209 to one revolution. A slip clutch 225 is mounted on the shaft 209 to compensate for overrun of the timing motor 210. The cams 203–207 operate a plurality of switches $S_8$–$S_{12}$ through which an operating potential is applied to the valves $V_6$–$V_9$ by a potential source 212. The angular positions of the cams 203–207 relative to the motor shaft 209 are adjustable so that any desired sequence of operation can be obtained by setting the cams 203–207 of desired angular positions.

Operation of the glass sleeve transfer apparatus

In the operation of the transfer apparatus of FIG. 10, after the turret 22 has been indexed to advance an assembly fixture 21 from station 1 to station 2 of the assembly machine, a glass sleeve 32 is inserted into the tube 191. The glass sleeve 32 is directed by the tube 191 to the space between the groove 124 in the front face of the transfer member 123 and the groove 131 in the guide member 128. When the bottom end of the glass sleeve 32 contacts the projection 132′ of the stop 132, the motion of the glass sleeve is stopped and the glass sleeve is brought to a first desired position relative to the front face of the transfer member 123. The movement of the turret 22 closes the switch 195 (FIG. 16) to operate the solenoid 215 which closes the switch 220 to energize the motor 210. The solenoid 215 also operates the escapement mechanism 190 to release the shaft 209 for rotation. The motor 210 rotates the shaft 209 and the cam 203 is first to operate its associated switch $S_8$. Upon the closing of switch $S_8$, the valve $V_9$ is opened to apply a vacuum from the source 202 to the flexible hose 126. When the vacuum is applied to the passageways 125 through the hose 126, a suction force is applied to the glass sleeve 32. The suction force draws the glass sleeve 32 into the groove 124 and holds the glass sleeve 32 against the front face of the transfer member 123.

Figure 13:
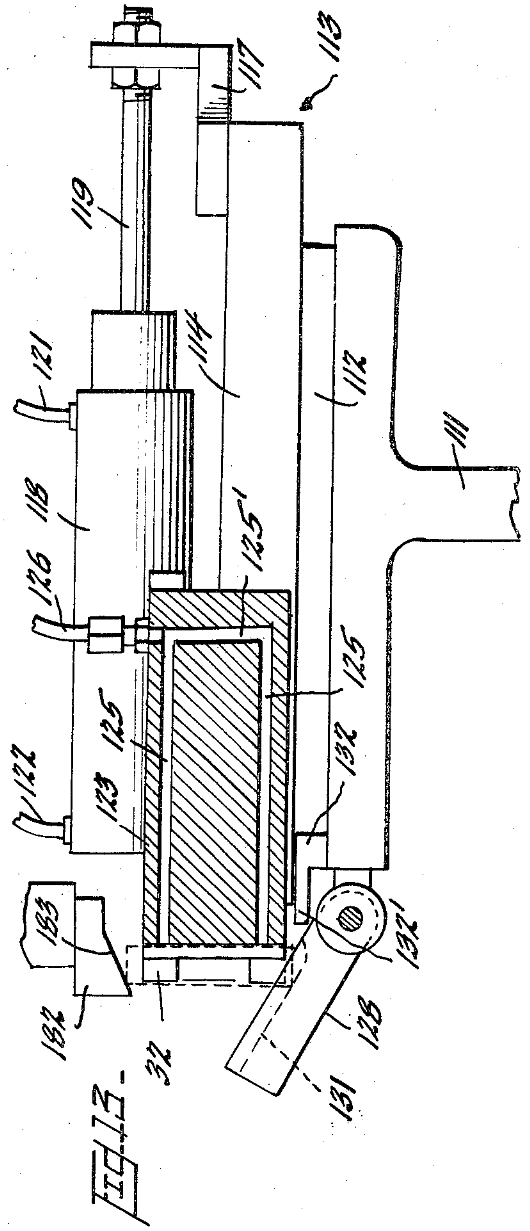
FIG. 13 is a side view, partially in section, of the transfer member illustrating the operation of the camming member and a pivotal guide member as the transfer member is moved toward the assembly fixture.

As the shaft 209 continues to rotate, the cam 204 is next to operate its associated switch $S_9$ to energize the valve $V_7$ such that pressurized air is applied to the air cylinder 118 through the flexible hose 121. The piston rod 119 is then drawn into the air cylinder 118 to advance the slide 113 toward an assembly fixture 121 which is positioned adjacent to the transfer apparatus. As the slide 113 begins to advance toward the assembly fixture 21, the lower arms 127′ on the transfer member 123 move into contact with the guide member 128 to pivot the guide member 128 downward out of the path of movement of the transfer member 123, as shown in FIGS. 13 and 14. The lower end of the glass sleeve 32 is moved off the projection 132′ of the stop 132 and at this point is held in a suspended position against the front face of the transfer member 123 by the applied vacuum. Further movement of the slide 113 and the transfer member 123 toward the assembly fixture 21, moves the top end of the glass sleeve 32 against the inclined surface 183 of the camming member 182. As the transfer member 123 moves the glass sleeve 32 along the inclined surface 183, the glass sleeve 32 is moved downward on the front face of the transfer member 123 to a desired position relative to its front face. The position of the glass sleeve 32 on the front face of the transfer member 123 is selected so that when the glass sleeve 32 is inserted into the workholder 29 of the assembly fixture 21 the top end of the glass sleeve is accurately positioned within the reflector 23 of the assembly fixture 21.

After the glass sleeve 32 has been moved past the camming member 182, the guide member 128 is completely pivoted out of the path of travel of the transfer member 123. The transfer member 123 continues to advance toward the workholder 29 until the glass sleeve 32 and the front face of the transfer member 123 move into a rectangular opening 29′ (FIG. 12) formed in the side of the workholder 29 facing the transfer apparatus. At the same time, the upper projecting arms 127 of the transfer member 123 move between an upper surface of the workholder 29 and the upper reflector 23 of the assembly fixture 21. Also, the lower projecting arms 127′ of the transfer member 123 move between a lower surface of the workholder 29 and the lower reflector 23′. The front face of the transfer member 123 moves into the opening 29′ of the workholder 29 to insert the glass sleeve 32 therein, and the upper and lower pairs of projecting arms span the workholder to guide the glass sleeve 32 to an exact position within the workholder 29. When the transfer member 123 reaches its fully extended position relative to the transfer device, the glass sleeve 32 is moved behind a resiliently biased clamping device mounted within the opening 29′. At this point the glass sleeve 32 is held by the resiliently biased clamping device within the opening 29′ in the workholder 29.

Next the cam 205 operates its associated switch $S_{10}$ to close the valve $V_9$. At this point the vacuum is no longer applied to the flexible hose 126 and passageways 125 so that the glass sleeve 32 is released from the groove 124. Shortly thereafter, the cam 206 closes its associated switch $S_{11}$ to operate the valves $V_6$–$V_8$. As a result, pressurized air is applied to the air cylinder 118 through the flexible hose 122 to move its piston rod 119 outward to retract the transfer member 123 from the workholder 29. As the transfer member 123 is moved to its original position, the guide member 128 is pivoted back to its original position against the front face of the transfer member 123.

Simultaneously, the air cylinders 152 and 172 are operated by applying pressurized air to the flexible hoses 154 and 134 to move the piston rods 151 and 171 into their respective air cylinders. Movement of the piston rod 151 pivots the crank member 142 in a clockwise direction (FIG. 11) to move the actuator member 139 downward between its guide members 141. Movement of the piston rod 171 pivots the crank member 162 in a counterclockwise direction (FIG. 11) to move the actuator member 159 upward between its guide members 151. As shown in FIG. 10 the upper projection 179 of the actuator member 159 moves into contact with a plate 27 projecting from the carriage 24 to move the carriage 24 downward on the assembly fixture 21. Similarly, the projection 181 of the actuator member 159 contacts the plate 28 projecting from the lower jaw carriage 25 to move the carriage 25 upward on the assembly fixture 21. Thus, the carriages 24 and 25 are moved toward the workholder 29 to insert the contacts 30 and 31 into the glass sleeve 32 in an overlapping relationship.

Finally, the cam 207 operates its associated switch $S_{12}$ to operate the valves $V_6$ and $V_8$ such that pressurized air is applied to the air cylinders 152 and 172 through the hoses 156 and 176. The piston rods 151 and 171 are moved outward from the air cylinders 152 and 172 to return the actuator members 139 and 159 to their initial positions on the plate 136. At this point, the escapement mechanism 190 operates to prevent further rotation of the shaft 209. The solenoid 215 and timing motor 210 are deenergized and the loading operation of station 2 is completed.

The amount of overlap is determined by the initial positions of the contacts 30 and 31 in the carriages 24 and 25. These positions are, in turn, determined by the initial positions of the contacts 30 and 31 on the transfer member 44 of the contact transfer device at station 1. Since the contacts 30 and 31 are positioned accurately in the jaw carriages 24 and 25 by the transfer member 44, the overlap obtained when the carriages 24 and 25 are moved toward the workholder 29 by the actuator members 139 and 159 is very accurately determined by the adjustable camming member 73 of the contact transfer device. Also, since the position of the glass sleeve 32 in the workholder 29 is accurately determined by the camming member 182 of the glass sleeve transfer apparatus, the glass sleeve 32 and the contacts 30 and 31 are positioned in precisely the same positions each time the transfer devices at stations 1 and 2 operate. For this reason, the completed sealed contact switches fabricated by the assembly machine of FIG. 1 have very accurate and uniform dimensions and characteristics.

The above-described apparatus is an embodiment of the present invention which illustrates the principles of the invention. It should be noted that the apparatus is not necessarily limited to the fabrication of sealed contact switches. Modifications in the apparatus and its operating cycle can be made by persons having ordinary skill in the art without departing from the scope of the present invention.

What is claimed is:

1. In an article assembly apparatus having a workholder movable from a first assembly station to a second assembly station, said workholder including a pair of spaced apart clamping devices mounted for relative movement to assemble an article:

said first assembly station including a transfer member mounted for movement in a pivotal path toward a first of said clamping devices and means for positioning a first article component on the transfer member, means for pivoting the transfer member to insert the first article component into a first of said clamping devices, means rendered effective upon the insertion of the first component into said first clamping device for advancing the workholder to the second assembly station, said second assembly station including a transfer member slidably mounted toward a second of said clamping means and means for positioning a second article component on the transfer member, means for sliding the transfer member toward the workholder to insert the second article component into the second clamping device, and means at said second assembly station selectively movable toward said clamping devices and rendered effective upon the insertion of the second article component into said second clamping device for engaging and imparting relative movement to said clamping devices to move the article components together to assemble the article.

2. In an article assembly apparatus having a workholder movable from a first assembly station to a second assembly station, said workholder including a pair of spaced apart clamping devices mounted for relative movement to assemble an article:

said first assembly station including a transfer member mounted for movement in a pivotal path toward the workholder and a slidably mounted plate having a surface which is in the pivotal path of said transfer member and is spaced from the transfer member, means for positioning a first article component between said transfer member and said surface of said plate, means for sliding said plate out of the pivotal path of said transfer member, means rendered effective upon the sliding of said plate out of the pivotal path of said transfer member for pivoting said transfer member to insert the first article component into a first of said clamping devices, means rendered effective upon the insertion of the first article component into said first clamping device for advancing the workholder to the second assembly station, said second assembly station including a slidably mounted transfer member having a front face projecting toward the workholder and a guide member pivotally mounted adjacent to the front face of the transfer member and urged against its front face, means for positioning a second article component between the guide member and the front face of the transfer member, means for advancing the transfer member toward the workholder to pivot said guide member away from its front face and to insert the second article component into the second clamping device, and means at said second assembly station rendered effective upon the insertion of the second article component into said second clamping device for imparting relative movement to said clamping devices to move the article components together to assemble the article.

3. In an article assembly apparatus having a workholder movable from a first assembly station to a second assembly station, said workholder including a resilient holding device and a pair of spaced apart clamping devices mounted for movement toward the resilient holding device from opposite sides thereof to assemble an article:

said first assembly station including a first transfer member mounted for movement in a pivotal path, and means for positioning a pair of spaced apart elongated article components on said first transfer member, means for pivoting said first transfer member to insert the elongated article components into the movable clamping devices, means rendered effective upon the insertion of the elongated article components into said movable clamping devices for advancing the workholder to the second assembly station, said second assembly station including a slidably mounted transfer member and means for positioning a hollow article component on the transfer member, means for advancing the transfer member toward the workholder to insert the hollow article component into the resilient holding device, and means at said second assembly station rendered effective upon the insertion of the hollow article component into the resilient holding device for moving the clamping devices toward each other to insert the elongated components into opposite ends of the hollow component to assemble the article.

4. In an article assembly apparatus having a workholder movable from a first assembly station to a second assembly station, said workholder including a resilient holding device and a pair of spaced apart clamping devices mounted for movement toward the resilient holding device from opposite sides thereof for assembling an article, as set forth in claim 3, wherein:

said first transfer member is provided with a pair of extensions for receiving and holding the elongated article components in a parallel relation and for inserting the components into the clamping devices in that relation whereupon movement of the clamping devices toward each other moves the components into an overlapping relationship.

5. In an article assembly apparatus:

a base;

an upright standard mounted upon said base;

an upper carriage movably mounted upon said standard;

an upper jaw member pivotally mounted upon said upper carriage, said jaw member having an article receiving portion for gripping a component of the article to be assembled;

means for spring biasing said upper jaw member to pivot said member and urge the article receiving portion thereof into a gripping condition;

a lower carriage movably mounted upon said standard;

a lower jaw member pivotally mounted upon said lower carriage, said jaw member having an article receiving portion for gripping a component of the article to be assembled;

means for spring biasing said lower jaw member to pivot said member and urge the article receiving portion thereof into a gripping condition;

means for exerting a force against said upper and lower jaw members to overcome said spring biasing forces and open the article receiving portions thereof;

means actuated while the article receiving portions of said jaw members are in an open condition for inserting components of the article to be assembled into the respective jaw members;

means rendered effective following insertion of article components into the article receiving portions of said jaw members for releasing said force exerted against said upper and lower jaw members to allow the article receiving portions of said members to grip the components; and means for moving said upper and lower carriages toward one another along said standard to bring the gripped article components into an assembled relationship.

6. In an article assembly apparatus as set forth in claim 5, wherein:

said upper and lower jaw members are pivotally mounted to extend in a direction parallel to said standard; and said upper and lower jaw members also include a butt portion spaced from said article receiving portion, said force exerted to overcome the spring bias of said jaw members being exerted against said butt portions.

7. In an article assembly apparatus as set forth in claim 5, also including:

means fixed to said standard between said upper and lower carriages for holding a third component of said article to be assembled, said three components being brought into an assembled relationship when said upper and lower carriages are moved toward one another.

References Cited

UNITED STATES PATENTS

| | | | |
|---|---|---|---|
| 2,984,046 | 5/1961 | Brewer et al. | 29—25.19 X |
| 3,137,929 | 6/1964 | Lyon et al. | 29—203 |
| 3,141,558 | 7/1964 | Gubitose | 214—1 |
| 3,203,081 | 8/1965 | Reck | 29—203 |
| 3,273,690 | 9/1966 | Monahan | 29—203 X |

THOMAS H. EAGER, Primary Examiner

U.S. Cl. X.R.

29—208